(12) United States Patent
Glejbøl

(10) Patent No.: US 6,634,387 B1
(45) Date of Patent: Oct. 21, 2003

(54) REINFORCED FLEXIBLE TUBULAR PIPE WITH CONVEYING BACK OF LEAK FLUID

(75) Inventor: Kristian Glejbøl, Albertslund (DK)

(73) Assignee: NKT Flexibles A/S, Brondby (DK)

( * ) Notice: Subject to any disclaimer, the term of this patent is extended or adjusted under 35 U.S.C. 154(b) by 0 days.

(21) Appl. No.: 09/787,620

(22) PCT Filed: Sep. 24, 1999

(86) PCT No.: PCT/DK99/00503
§ 371 (c)(1),
(2), (4) Date: May 10, 2001

(87) PCT Pub. No.: WO00/17479
PCT Pub. Date: Mar. 30, 2000

(30) Foreign Application Priority Data

Sep. 24, 1998 (DK) .......................... 1998 01204

(51) Int. Cl.⁷ ................................. F16L 55/00
(52) U.S. Cl. ................. 138/104; 138/116; 138/125; 138/135; 138/150
(58) Field of Search ............... 138/125, 116, 138/104, 122, 135, 150, 109

(56) References Cited

U.S. PATENT DOCUMENTS

| | | | |
|---|---|---|---|
| 3,029,094 A | 4/1962 | Parlasca et al. | 285/114 |
| 3,506,039 A | 4/1970 | Marriott | 138/114 |
| 4,149,568 A | 4/1979 | Kuntz et al. | 138/114 |
| 4,402,346 A * | 9/1983 | Cheetham et al. | 138/129 |
| 4,450,711 A | 5/1984 | Claude | 73/40.5 |
| 4,567,916 A * | 2/1986 | Antal et al. | 138/104 |
| 4,691,740 A * | 9/1987 | Svetlik et al. | 138/109 |
| 4,759,573 A | 7/1988 | Delamare | 285/137.1 |
| 4,932,810 A | 6/1990 | Austin | 405/157 |
| 5,203,378 A * | 4/1993 | Williams | 138/109 |
| 5,275,209 A * | 1/1994 | Sugier et al. | 138/135 |
| 5,406,984 A * | 4/1995 | Sugier et al. | 138/135 |
| 5,654,499 A * | 8/1997 | Manuli | 138/104 |
| 5,884,657 A * | 3/1999 | Srock | 138/104 |
| 6,039,083 A * | 3/2000 | Loper | 138/135 |
| 6,129,107 A * | 10/2000 | Jackson | 138/104 |

FOREIGN PATENT DOCUMENTS

| | | |
|---|---|---|
| DE | 1093148 | 11/1960 |
| NO | 300471 | 6/1997 |
| SE | 330293 | 12/1970 |
| SE | 80083272 | 6/1986 |
| WO | 8502001 | 5/1985 |
| WO | 9840657 | 9/1998 |

OTHER PUBLICATIONS

K.K.H. Schimmelpfennig "A Novel Flexible Offshore LNG–Pipe System With Continuous Operating Control" OTC 3666 Apr. 30–May 3, 1979, p. 2711–2720.

* cited by examiner

*Primary Examiner*—James Hook
(74) *Attorney, Agent, or Firm*—Ladas & Parry

(57) ABSTRACT

A reinforced flexible tubular pipe including an inner liner (3) that forms a barrier against outflow of medium that flows through the pipe, the inner liner (3) being encased by at least one reinforcing layer having a space in which a number of profiles are configured that are coiled around the inner liner such that the profiles are completely or partially surrounded by a lumen (10) that allows transport of fluids in the longitudinal direction of the pipe. Outside the reinforcing layer an outer coating (9) is provided to form a barrier against inflow of fluids or gases from the surroundings of the pipe to the reinforcing layer. At least one flow path (11) is provided to convey fluid or gas away from the lumen (10). This flow path (11) is provided with an inlet opening that debouches in the lumen (10) and an outlet opening (13) that ends in the inner liner of the tubular pipe. The flow path (11) may be provided with a pump (12) or a one-way valve (15) that prevents fluid or gas from flowing into the lumen from the pipe interior.

15 Claims, 5 Drawing Sheets

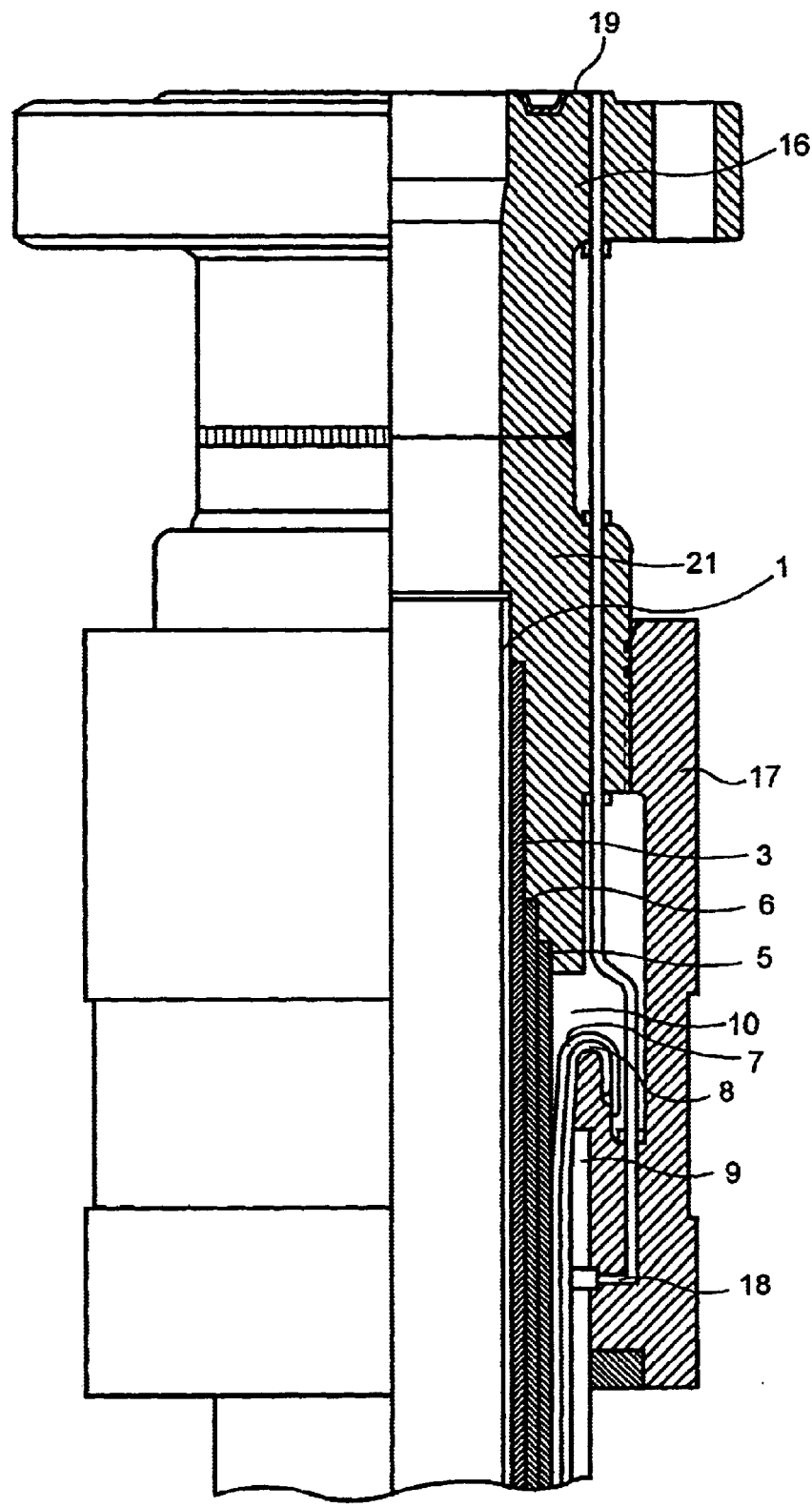
F I G. 5

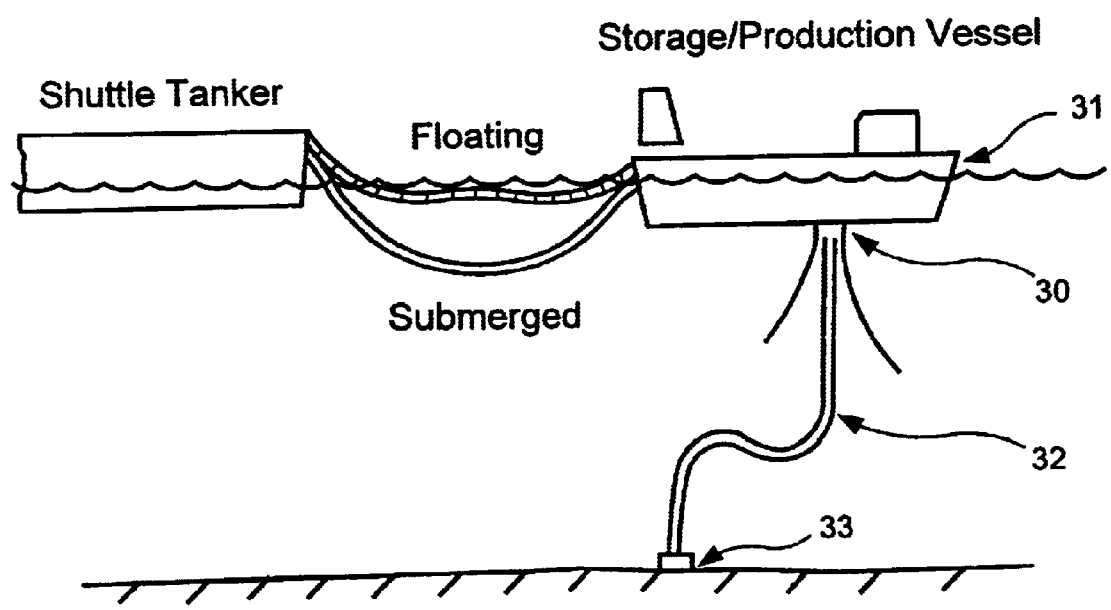
F I G. 7

REINFORCED FLEXIBLE TUBULAR PIPE WITH CONVEYING BACK OF LEAK FLUID

The present invention relates to a reinforced flexible tubular pipe comprising an inner liner that forms a barrier against outflow of the medium that flows through the tubular pipe, said inner liner being encased by at least one reinforcing layer containing a number of profiles that have been coiled around the inner liner in such a manner that the profiles are entirely or partially contained in a lumen that allows transport of fluids in the longitudinal direction of the tubular pipe, and wherein—outside the reinforcing layer—an outer jacket is provided with a view to forming a barrier against unimpeded inflow of fluids and/or gases from the environment surrounding the tubular pipe and to the reinforcing layer. Such a reinforced flexible tubular is disclosed in Schlimmelpfennig, "A novel flexible offshore LNG-pipe system with continues operating control".

The reinforcing layer is not secured to the inner liner, but is able to move relative thereto which ensures the flexibility of the tubular pipe. Outside the reinforcing layer, an outer coating is provided with a view to forming a barrier against inflow of fluids and/or gasses from the environment surrounding the tubular pipe to the reinforcing layer.

However, positioning of reinforcing elements in the outer coating makes it possible to impart to this layer a structural functionality, too. Also, outside the outer jacket, a further reinforcing layer can be provided. To prevent collapse of the inner liner, it is often lined with a flexible steel pipe. In the following this pipe is designated 'carcass'.

Most often such tubular pipes are used to transport fluids and gases at various depths of sea, and they are used in particular in situations where very high or varying water pressures prevail along the longitudinal axis of the pipe. Examples of such include riser pipes that extend from the seabed and up to an installation on or near sea level. In the technical literature this type of riser pipes is known as risers. Also between installations arranged on the seabed at great depth, or between installations near the surface of the sea, this type of tubular design is employed. Pipes for this use, are known in the technical literature as flowlines or jumpers.

The coiled reinforcing layer of the tubular pipe is configured of a number of layers of profiles, often of steel, mounted at like or different pitches.

During manufacture, transport and operation the tubular pipe is exposed to circumferential pressure as well as forces acting along the axis of the tubular pipe. It is thus the task of the reinforcing layer to absorb these forces to prevent the inner liner from being destroyed.

The specific configuration of the reinforcing layer depends on the use of the tubular pipe. It should be noted in particular in connection with the reinforcing layer that it contains a lumen between the coiled profiles which is necessary to enable the reinforcing profiles to move relative to each other. The movability of the reinforcing profiles is necessary to ensure the flexibility of the tubular pipe.

It is a problem with the known tubular pipes that a certain diffusion will always occur through the inner liner which means that undesired amounts of gases and condensate will accumulate in the reinforcing layer ia with ensuing. corrosion of the reinforcing profiles.

Furthermore accumulation of pressure in the reinforcing layer due to gas diffusion can cause the outer jacket to burst which will destroy the tubular member.

Several methods are known for reducing or preventing the destructive effect of diffusion into the reinforcing layer.

NO 300471 B1 discloses a method of ventilating the reinforcing layer towards the surroundings which is possible when a positive, super-atmospheric pressure prevails between the reinforcing layer and the surroundings.

A similar method is also described in U.S. Pat. No 4932810. However, it should be noted that the tubular pipe described in the US disclosure is of a different type.

WO 98/40657 A1 teaches how it is possible to construct a tubular member of two concentric shells so as to provide therebetween a flushing space. The flushing space thus accomplished is cleaned continually by a medium flowing therethrough.

Despite the fact that both NO 300471 B1 and WO 98/40657 A1 teach methods suitable for ventilating or cleaning reinforcing layers, both methods are less suitable for the maintenance of a flexible tubular member, the object of which being to transport fluids at great varying depths of sea.

The unsuitability of the methods is due to the fact that pipes operating at varying depths of sea are often attacked by gases and fluids that penetrate the reinforcing layer with ensuing formation of condensate, said condensate accumulating at the lowermost part of the pipe. NO 300471 B1 does not teach a method of removing such condensate, the valves shown in the patent for ventilation acting exclusively on gases that are ventilated at a positive difference of pressure between the reinforcing layer and the environment surrounding the tubular pipe.

Nor does WO 98/40657 A1 teach a method suitable for removal of condensates from the reinforcing layer on tubular pipes arranged below water at varying depths.

This is due to the fact that tubular pipes of the kind disclosed therein often contain a mixture of condensate and accumulated gases with an effective density which is substantially lower than that of water.

A forced flushing of the tubular pipe will therefore not be possible without pressurising the reinforcing layer near the point of entry for the flushing agent to a pressure that exceeds the ambient pressure. Pressurisation of the reinforcing layer, may entail a rupture of the outer jacket of the tubular pipe with ensuing destruction of the tubular pipe, bearing in mind that pressurisation of the tubular pipe with the object of flushing same can only be accomplished in practice provided the pressurisation occurs in the upper part of the tubular pipe.

In the light of this it is the object of the present invention to provide a reinforced, flexible tubular pipe that completely or partially remedies the above-mentioned drawbacks associated with the prior art pipes.

In accordance with the present invention this is accomplished by a tubular pipe of the type described in the introductory part which is characterised in that at least one flow path is arranged for conveying fluids from said lumen to the fluid transported in the inner liner of the tubular pipe.

In this manner it is possible, at all depths of sea, to empty the reinforcing layer without substantial, adverse pressurisation. Further advantageously, the surrounding environment is not exposed to contamination by fluids that derive from the reinforcing layers.

In some cases, eg in case of transport of aggressive fluids, the conditions of operation can be such that the flow path is advantageously, and as featured in claim 2, configured with means that prevent flow into the lumen of the fluid which is transported in the pipe interior.

Convenient embodiments of these means can be configured such, as featured in claim 3, that the means consist of a valve that allows flow only in case there is a negative difference in pressure between the pipe interior and the lumen.

In case the pressure within the pipe only rarely drops below the pressure in the reinforcing layers, the means can conveniently be configured in accordance with claim 4, ie in the form of a pump that forces the flow from the lumen and to the pipe interior, and furthermore the pump can, as featured in claim 5, be configured with a passageway or a bypass valve thereby enabling flow at any time provided there is a negative difference of pressure between the pipe interior and the lumen.

In this context it should be noted that use of a pump is particularly advantageous, the partial pressure (which is desirably low-value) of eg aggressive fluids in the free volume being hereby controllable, irrespective of the pressure within the inner liner of the pipe.

In an alternative embodiment there is, as featured in claim 6, provided a safety valve in the flow path. This safety valve can be used to optionally close the flow path completely to flow of fluid or gas, if desired.

Conveniently, as featured in claim 7, two or more blocking valves are provided that are, flow-wise, arranged on each their side of the means arranged in the flow path. Hereby the advantage is obtained that in case defaults occur in the valve or pump configured in the flow path with ensuing operational shutdowns, such failure can be remedied without resulting exposure of neither the lumen nor the pipe interior to the surroundings.

Moreover, the reinforced flexible tubular pipe can conveniently, and as featured in claim 8, comprise a coupling element for attachment of the reinforced flexible tubular member on another construction or to another tubular pipe where the flow path extends completely or partially into the coupling element.

In this manner, it can be completely or partially avoided to perforate the liner and the coating and optionally the reinforcing layer itself.

Moreover, in practice the reinforced flexible tubular pipe can, as described more detailed in claim 9, comprise at least two reinforced flexible tubular pipes, said tubular pipes being connected in extension of each other by means of connecting elements, and wherein the connecting element is provided with passages that allow fluid and gas in the one reinforced flexible tubular member to flow through the coupling element to the reinforcing layer in the second of the two reinforced flexible tubular pipes.

A further, preferred embodiment of the reinforced, flexible tubular pipe is, as featured in claim 10, additionally provided with at least one further flow path with a view to introducing to the reinforcing layer fluids or gases for cleaning and maintenance. Such cleaning fluids can be of a nature that prevents attacks on the reinforcement.

The present invention is particularly advantageous in connection with pipe installations in which the reinforced flexible tubular pipe is, as featured in claim 11, the cleaning and maintaining fluid or gas supplied to the lumen has a density comprised within the range of from 0.9 and 1.1 times the density of the sea water in which the pipe is used.

Moreover, the reinforced flexible tubular pipe is conveniently constructed in accordance with the features of claim 14 in that it comprises a plurality of reinforced flexible tubular pipes that extend between an installation arranged on the seabed and to a surface vessel or a platform at sea level.

Finally, claims 12 and 13 feature further convenient embodiments of the invention.

BRIEF DESCRIPTION OF DRAWINGS

The invention will now be explained in further detail with reference to the drawings, wherein

FIG. 5 is a sectional view of a connecting means according to the invention;

FIG. 7 is an explanatory sketch showing an installation comprising a tubular pipe in accordance with the invention.

Accordingly, FIG. 1 shows a sketch of a segment of a flexible tubular pipe of commonly known type, which tubular pipe is often used as riser between installations on the seabed and an installation located at sea level, such as a vessel or a platform. For instance, this could be in connection with the exploitation of oil and/or gases or transport. The tubular pipe can also be used as transport line between two installations that are both located close to sea level, close to the seabed or relatively deep below sea level.

Figure 1:
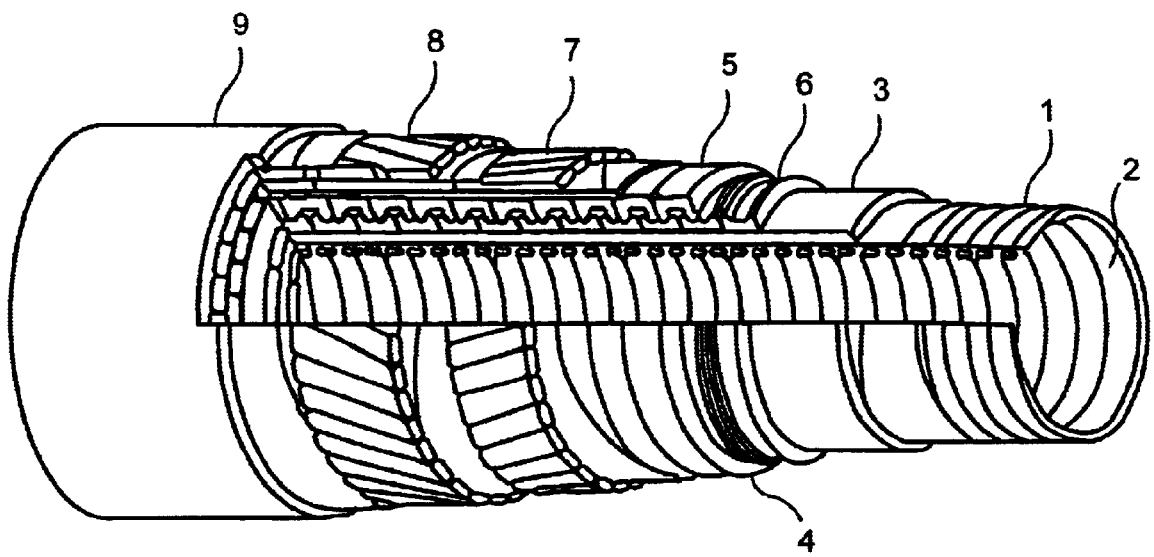
FIG. 1 is a perspective sketch illustrating the construction of a commonly known tubular pipe.

Such tubular pipes are known today in a wide variety of configurations, and thus FIG. 1 serves only to illustrate, the present invention also being useful in connection with reinforced flexible tubular pipes having other configurations.

As will appear from FIG. 1, these tubular pipes consist of an inner liner 3 that encloses a carcass 1 constituted by a metal band 2 which is coiled so as to form an inner pipe, and wherein the metal band 2 is, during coiling, configured with flaps that engage with each other whereby they are caused to lock the individual windings in the coiled band 2 to each other in such a manner that the carcass 1 can be flexed out of its longitudinal direction. The inner carcass 1 thus not being in itself impermeable, the enclosing liner 3 serves to completely or partially prevent fluid or gas from flowing from the pipe interior and out.

Obviously, the liner 3 can be a more or less integral part of the above-mentioned carcass, albeit shown herein as a separate unit.

Exteriorly of the liner 3 and conventionally, one or more layers of reinforcing profiles 5,6 are coiled that form windings with very little pitch compared to the longitudinal direction of the tubular pipe. Thus, these windings form a high degree of resistance against the liner 3 bursting due to elevated pressure on the tubular pipe inside which means that the reinforcement formed by these profiles is often designated a pressure reinforcement 4. As will appear from the figure, those profiles 5,6 that constitute the pressure reinforcement 4 may be C-shaped profiles, which profiles have such orientation that two layers of windings coiled around the liner 3 in the same direction engage in each other. However, other profile types, eg Z-shaped and T-shaped profile types, are used for the same purpose.

At least some of the prior art tubular pipes are, exteriorly of the pressure reinforcement, provided with a further reinforcement consisting of one or more layers of profiles 7,8 that are most often coiled with a substantially larger pitch than the above-mentioned pressure reinforcement profiles 5,6, whereby they are able to effectively absorb the tensile forces in the longitudinal direction of the pipe which may occur during laying or operation of the tubular pipe. Therefore this outer reinforcement is often designated tensile reinforcement.

In order to ensure that the tubular pipe is flexible and can be bent relative to the longitudinal direction of the tubular pipe, the individual reinforcing profiles 5,6,7,8 are arranged such that there is play between the coils thereof. In combination these plays form a lumen 10 between the reinforcing profiles 5,6,7 and 8 that allows fluid or gas to flow along the longitudinal direction of the tubular pipe.

Between the above-mentioned reinforcing profiles 5,6,7 and 8, relatively thin layers can be arranged of a material that serves ia to prevent tearing between abutting profiles when the pipes are bent.

Obviously the above-described composition of profiles serves merely to exemplify a construction of such reinforced flexible tubular pipe and many variations can be made on the basis of this fundamental principle.

Generally, however, the exterior of the reinforcing layer that comprises said lumen 10 and the reinforcing profiles 5,6,7,8 is provided with an outer jacket 9 that can be configured in a wide variety of ways comprising, however, at least a material layer, preferably of plastics, which serves as a barrier against fluids flowing freely from the surroundings of the tubular pipe and into the free volume 10 between the reinforcing profiles 5,6,7 and 8.

Operating conditions in which such pipes function are demanding and it is not possible to achieve full guarantee against small amounts of fluids in the form of fluid or gas from the surroundings of the tubular pipe diffusing into the lumen 10 and thus is caused to be in contact with the reinforcing profiles 5,6,7 and 8. In certain cases this means that from the outside of the tubular pipe water diffuses into the lumen 10 and that simultaneously ia water, $CO_2$ and $H_2S$ diffuse into the lumen from the tubular pipe interior into the lumen 10 which may give rise to an undesired decomposition of the reinforcing profiles 5,6,7 and 8 with an ensuing substantial reduction in the longevity of the tubular pipe. The accumulation of pressure due to the formation of gas in the reinforcing layer will also in certain cases result in the outer jacket of the pipe bursting.

Figure 2:
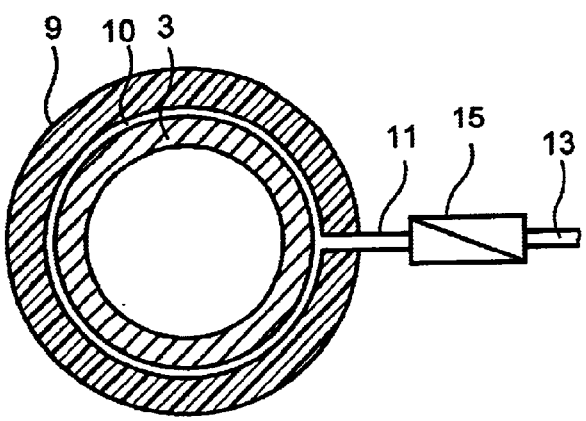
FIG. 2 is an explanatory sketch illustrating the principles of a prior art construction in the form of a section through a tubular pipe according to the invention.
Figure 3:
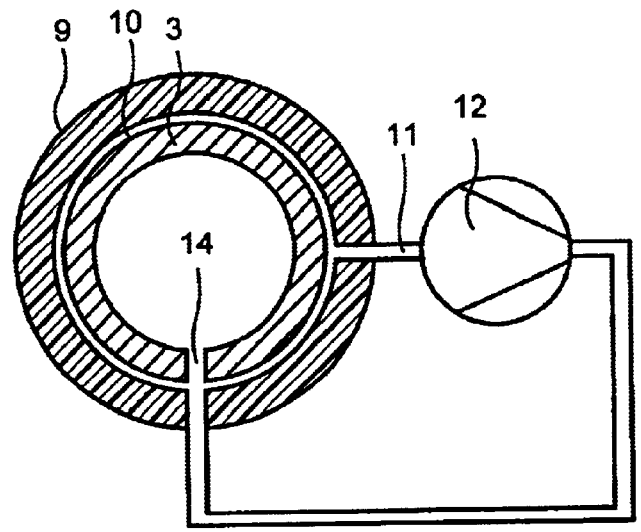
FIG. 3 is an explanatory sketch corresponding to FIG. 2, depicting, however, a first embodiment of the invention.

FIG. 2 is an explanatory sketch of the prior art whereas FIGS. 3 and 4 illustrate two alternative embodiments in accordance with the present invention. Exclusively for the sake of understanding, these figures include a depiction of the inner liner 3, the outer coating 9 and the lumen therebetween and which contains not shown reinforcing profiles.

Thus, FIG. 2 will show that a flow path 11 is provided that extends from its inlet opening that debouches into the lumen 10, and out through the outer coating 9, wherein said flow path 11 is provided with a one-way valve 15 which is so configured that it allows unimpeded flow provided a positive difference in pressure prevails between the reinforcing layer and the surroundings.

In an operative situation it is hereby possible to have a flow of fluid or accumulated gas from the lumen 10 and out on the outside of the tube when the pressure in the lumen exceeds the ambient pressure.

In the first embodiment of the invention the flow path, as shown in FIG. 3, debouches in the pipe interior 14. As shown in the figure, the flow path includes a pump 12 that is able to actively pump fluid from the lumen to the pipe interior.

Figure 4A:
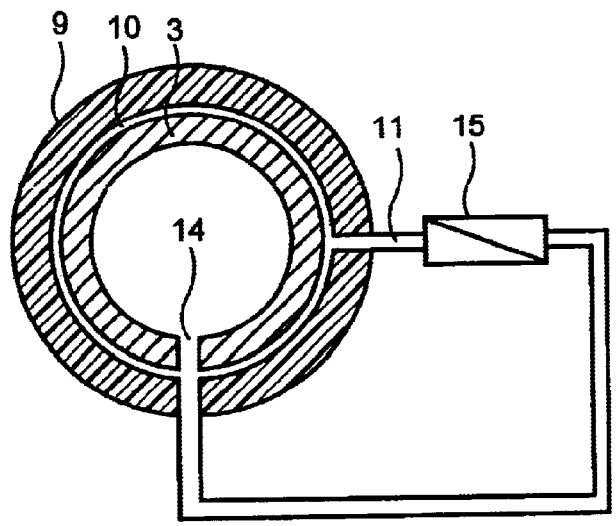
FIG. 4A is an explanatory sketch corresponding to FIG. 3, wherein, however, an alternative embodiment of the invention is shown.
Figure 4B:
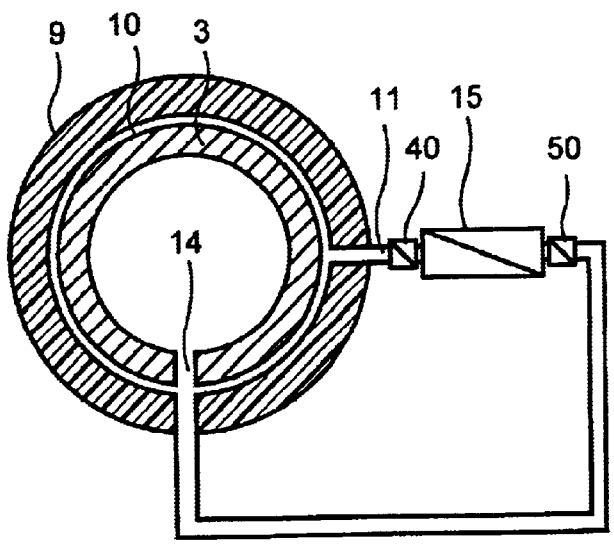
FIG. 4B is an explanatory sketch corresponding to FIG. 4A with the addition of blocking valves.

Now, FIG. 4A shows the second embodiment of the invention wherein, instead of the pump shown in FIG. 3, a valve 15 is arranged which is of the one-way type. The one-way valve shown in FIG. 4A can, in a preferred embodiment shown in FIG. 4B, be configured with [no shown] blocking valve means 40, 50 for closing the valve completely to flow from both sides in response to given information, thereby further contributing to avoid occurrence of undesired flow of fluids or gases from the pipe interior and into the lumen through the flow path 11. Corresponding means can also be provided in combination with the pump shown in FIG. 3 with the result that also in this embodiment, it is ensured to a higher degree that backflow of fluids from the surroundings of the tubular pipe and into the lumen 10 is avoided, and such means can optionally be used both upstream and downstream of the one-way valve or the pump with a view to servicing same in practice without ensuing risk of leak form the lumen and from the pipe interior.

Obviously, alternative embodiments and other combinations than the two suggested in FIGS. 3 and 4 are thinkable. In practice tubular pipes with the construction in accordance with the principles shown in FIG. 1 are manufactured in final lengths, the pipes in question having considerable diameters and bulks that are handled only with difficulty when very long. Therefor coupling elements are often used for coupling one or more pipes of the type shown in FIG. 1, whereby tubular pipes of desired lengths can be produced, the lengths of which exceed the length of a single integral tubular pipe.

Thus, FIG. 5 is a sectional view illustrating a part of a connecting element having a pipe mounted therein which is of the type shown in FIG. 1. Thus, this coupling element has a mounting flange 16 with an abutment face 19 and a holding element 17 and 21 for securing a tubular pipe that consists of an inner carcass 1, an inner liner 3, reinforcing profiles 5,6,7 and 8 which are arranged in the lumen 10, and an outer coating 9.

In a known manner means are provided that are intended to secure the tubular pipe in the coupling element.

As will appear and in accordance with the invention, a flow passage 18 is provided that extends from the lumen 10 and to the abutment face 19 of the mounting flange which means that this flow passage 18 can be arranged opposite a corresponding flow passage on another connecting element or another construction thereby enabling emptying of the lumen 10 via this flow passage 18.

Figure 6:
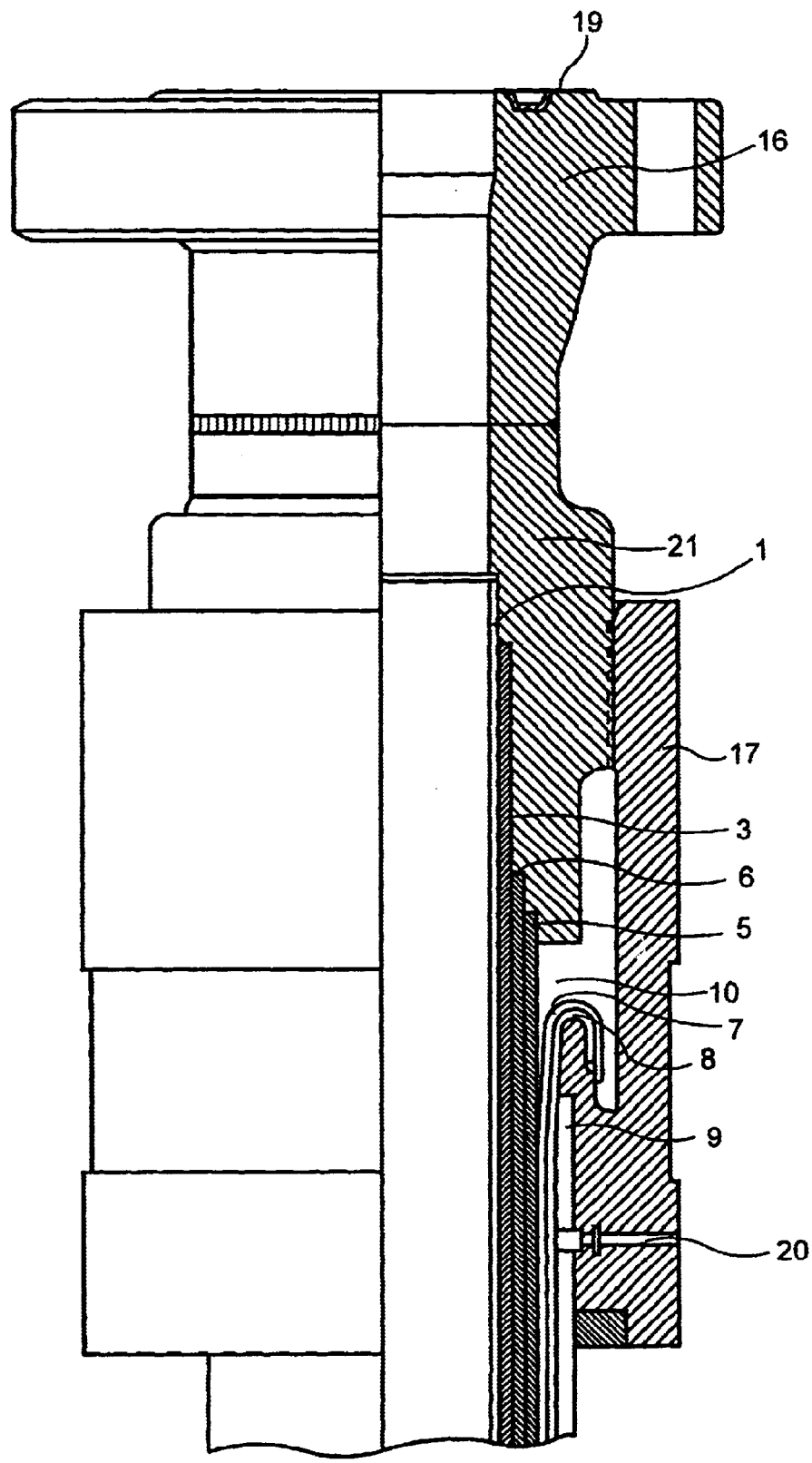
FIG. 6 is a sectional view of an end coupling element according to the invention.

Now FIG. 6 shows an alternative embodiment of a coupling element according to the invention in the form of an end coupling element, the most significant difference being, in this context, that the flow passage 20 leads to the side of the coupling element which enables direct coupling of a valve thereto in the same manner as is shown in principle in FIG. 2, 3 and 4.

The end coupling element according to FIG. 6 is, according to a preferred embodiment of the invention, provided with a duct 20 for the introduction of fluids for maintenance. This means that, at the upper end of the pipe, fluids or gases can be introduced which will subsequently flow in the lumen of the pipe and downwards and consequently effectively treat the reinforcing profiles and optionally other components of the pipe.

According to a further preferred embodiment of the invention, a flow passage of the type shown in one of the above-described FIGS. 3 to 4 is provided at the lowermost end of the pipe in such a manner that the maintenance fluids can be discharged thereby.

Now FIG. 7 is an explanatory sketch illustrating an end coupling element 30 for securing a tubular pipe 32 fra eg a vessel 31 or a platform whereby the tubular pipe 32 can be used as riser and is more or less freely suspended from the vessel 31 or the platform and is at the bottom—in a manner known per se—secured to an installation at the seabed by means of an end coupling 33. According to one aspect of the present invention, the end coupling element 30 at the vessel 31 or the platform can be provided with a filling duct as stipulated above for filling maintenance fluids into the lumen in the tubular pipe 32, and the end coupling element 33 at the seabed can be provided with a flow passage as described above in connection with the figures, for discharging fluids from the lumen of the tubular pipe 32.

Obviously the present invention can be exercised in other manners than the ones shown above, it being possible to exercise the principles of the invention within a very wide framework in connection with pipes, coupling elements and end coupling elements of differing configurations without hereby modifying the fundamental functioning of the invention.

What is claimed is:

1. A reinforced flexible tubular pipe comprising an inner liner that forms a barrier against outflow of a medium that flows through an interior of the pipe, said inner liner being encased by at least one reinforcing layer containing a plurality of profiles that are coiled around the inner liner such that the profiles are completely or partially enclosed by a lumen that allows transport of fluids in the longitudinal direction of the pipe, an outer jacket disposed outside the reinforcing layer for forming a barrier against free inflow of fluids, gases, or both from surroundings of the pipe to the reinforcing layer, and at least one flow path for conveying fluid or gas away from said lumen to the interior of the pipe for transport of the conveyed fluid or gas with the medium that flows through the pipe interior.

2. A reinforced flexible pipe according to claim 1, comprising means disposed in the flow path to prevent flow of transported fluid into the lumen.

3. A reinforced flexible tubular pipe according to claim 2, wherein the at least one flow path comprises at least two blocking valves that are, flow-wise, disposed on respective first and second sides of the means.

4. A reinforced flexible tubular pipe according to claim 2, wherein the means comprises a valve that allows flow only when a negative difference of pressure prevails between the pipe interior and the lumen.

5. A reinforced flexible tubular pipe according to claim 2, wherein the means comprise a pump that forces flow of fluid from the lumen and into the pipe interior.

6. A reinforced tubular pipe according to claim 5, wherein the pump comprises a passageway or a by-pass valve that enables the pump to always flow provided a negative difference in pressure prevails between the pipe interior and the lumen.

7. A reinforced flexible tubular pipe according to claim 1, wherein the at least one flow path comprises a safety valve.

8. A reinforced flexible tubular pipe according to claim 1, comprising a coupling element for securing the reinforced flexible tubular pipe on another construction or to another tubular pipe, wherein the at least one flow path completely or partially extends into the coupling element.

9. An apparatus comprising first and second reinforced flexible tubular pipes according to claim 1, said first and second tubular pipes being connected by a connecting element, wherein the connecting element is provided with ducts that allow fluid and gas within the first reinforced flexible tubular pipe to flow through the connecting element into the reinforcing layer in the second reinforced flexible tubular pipe.

10. A reinforced flexible tubular pipe according to claim 1, comprising at least one further flow path disposed to supply a fluid or gas for cleaning and maintenance to the lumen.

11. A method for transporting fluids or gases comprising (a) providing the reinforced flexible tubular pipe according to claim 10 at a depth beneath the sea; and (b) supplying a fluid or gas to the lumen for cleaning and maintenance thereof, wherein the fluid or gas for cleaning and maintenance supplied to the lumen has a density within a range of from 0.9 to 1.1 times a density of the seawater at sea depth.

12. A reinforced tubular pipe according to claim 10, wherein the flow path for supplying the fluid or gas for cleaning or maintenance is disposed at an upper end of the reinforced flexible tubular pipe.

13. A reinforced flexible tubular pipe according to claim 1, wherein the reinforced flexible tubular pipe comprises an upper and a lower end with the lower end being disposed below the upper end, and wherein the at least one flow path for conveying fluid or gas away from the reinforcing layer is disposed at the lower end of the reinforced flexible tubular pipe.

14. An apparatus comprising a plurality of reinforced flexible tubular pipes according to claim 1.

15. A method for transporting a fluid or gas between an installation at a seabed and a surface vessel, said method comprising (a) providing a pipe installation comprising a plurality of pipes according to claim 1, said pipe installation extending between, the seabed and the surface vessel; and (b) transporting the fluid or gas between the installation at the seabed and the surface vessel through the pipe installation.

* * * * *